(12) United States Patent
Hurley et al.

(10) Patent No.: US 10,136,767 B2
(45) Date of Patent: *Nov. 27, 2018

(54) PERSONAL CARE ACCESSORY SUPPORT SYSTEM

(71) Applicant: LIBERTY HARDWARE MFG. CORP., Winston-Salem, NC (US)

(72) Inventors: Christina Hurley, Winston-Salem, NC (US); Adam Callif, Chicago, IL (US); Nathaniel Faltin Dutton Schultz, Charlotte, NC (US); Earl David Forrest, Asheboro, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,900

(22) Filed: May 24, 2017

(65) Prior Publication Data

US 2017/0251885 A1 Sep. 7, 2017

Related U.S. Application Data

(63) Continuation of application No. 14/918,076, filed on Oct. 20, 2015, now Pat. No. 9,681,781.

(51) Int. Cl.
*A47F 7/00* (2006.01)
*A47F 5/00* (2006.01)
(Continued)

(52) U.S. Cl.
CPC .............. *A47K 5/18* (2013.01); *A47F 5/0876* (2013.01); *A47K 3/281* (2013.01); *D06F 57/12* (2013.01);
(Continued)

(58) Field of Classification Search
CPC ...... A47K 5/18; A47K 3/281; A47K 2201/02; A47K 10/10; F16B 47/003; F16B 35/04;
(Continued)

(56) References Cited

U.S. PATENT DOCUMENTS

| 399,825 A | 3/1889 | Brechbill et al. |
| 1,575,270 A | 3/1926 | Jankowsky |

(Continued)

FOREIGN PATENT DOCUMENTS

CN 203000475 U 6/2013

OTHER PUBLICATIONS

Anself, "Anself Adhesive Stick Bathroom, Magic Mop and Broom Organiser, Wall Mounted Storage & Organizer for Your Home, Closet, Garage and Shed, Holds Up to 11 Tools, Superior Quality Tool Rack Holds Mops, Brooms, or Sports Equipment", Mar. 21, 2015, 4 pages.

*Primary Examiner* — Jennifer E. Novosad
(74) *Attorney, Agent, or Firm* — Brooks Kishman P.C.; Lora Graentzdoerffer

(57) ABSTRACT

A personal care accessory support system is provided with a rail with at least one fastener configuration to fasten the rail to an upright support surface. A plurality of receptacles is formed in the rail. At least two accessory holders are provided. Each of the at least two accessory holders is provided with a base to receive and support an accessory. A retainer is sized to extend over the rail in a horizontal orientation of the rail to mount and support the accessory holder on the rail. The retainer is also sized to extend into one of the plurality of receptacles in a vertical orientation of the rail to mount and support the accessory holder on the rail.

18 Claims, 8 Drawing Sheets

(51) Int. Cl.
*A47F 5/08* (2006.01)
*A47K 5/18* (2006.01)
*A47K 3/28* (2006.01)
*D06F 57/12* (2006.01)
*F16B 47/00* (2006.01)
*F16B 11/00* (2006.01)

(52) U.S. Cl.
CPC .......... *F16B 11/006* (2013.01); *F16B 47/003* (2013.01); *A47K 2201/02* (2013.01)

(58) Field of Classification Search
CPC ...... F16B 11/006; F16B 13/141; F16B 35/06; D06F 57/12; A47G 25/06; A47G 25/0607; A47G 25/0614; A47G 25/0635; A47G 25/0692; A47G 1/17; A47B 73/00; A47B 73/002; A47B 96/067; A47B 95/008; A47B 55/02; A47F 7/146; A47F 5/08; A47F 5/0807; A47F 5/01; A47F 5/0876; A47F 5/0846; A47F 5/0838; A47J 47/16; Y10S 292/10; E05B 15/1607
USPC .... 211/119.009, 119.004, 87.01, 32, 106.01, 211/181.1, 94.01, 75, 70.6; 248/175, 248/205.1, 207, 215, 304, 231.9, 251, 248/214, 220.21, 205.3, 205.4, 683, 467; 292/251; 411/82, 396, 546

See application file for complete search history.

(56) References Cited

U.S. PATENT DOCUMENTS

| | | | |
|---|---|---|---|
| 3,178,033 A | 4/1965 | Wirsing | |
| 3,198,343 A | 8/1965 | Pollock | |
| 3,412,867 A | 11/1968 | Barkow | |
| 4,069,920 A | 1/1978 | Ross | |
| 4,367,819 A * | 1/1983 | Lewis | A47G 25/0678 211/106.01 |
| 4,372,450 A | 2/1983 | Licari et al. | |
| D271,545 S | 11/1983 | Licari et al. | |
| 4,576,355 A * | 3/1986 | Graf | A47B 95/008 248/223.41 |
| 4,893,777 A | 1/1990 | Gassaway | |
| 5,188,325 A | 2/1993 | Hilty et al. | |
| 5,333,743 A | 8/1994 | Loewke et al. | |
| 5,626,244 A | 5/1997 | Mesna et al. | |
| 5,695,165 A * | 12/1997 | Moriarty | B01L 9/54 248/205.4 |
| 5,927,840 A | 7/1999 | Bzowski | |
| 6,112,909 A | 9/2000 | Moseley | |
| 6,220,460 B1 * | 4/2001 | Pan | A47K 10/10 211/105.1 |
| 6,299,001 B1 * | 10/2001 | Frolov | A47F 5/01 211/106 |
| 6,299,118 B1 | 10/2001 | Farrell | |
| 6,729,591 B2 * | 5/2004 | Hsu | G09F 1/10 248/205.6 |
| 6,892,894 B2 | 5/2005 | Aiken | |
| 7,322,482 B2 | 1/2008 | Caradonna | |
| 7,540,456 B2 * | 6/2009 | Thompson | A47G 1/175 211/105.1 |
| 7,584,582 B1 * | 9/2009 | Hutter, III | B64C 1/40 156/91 |
| D608,054 S | 1/2010 | Radfar | |
| 7,845,604 B2 | 12/2010 | Connor, Jr. | |
| 7,931,161 B2 * | 4/2011 | Newbould | A47K 3/281 211/106 |
| 8,132,766 B2 * | 3/2012 | Tooley | A47K 5/18 248/205.5 |
| 8,141,722 B2 | 3/2012 | Heroux | |
| 8,308,116 B2 | 11/2012 | Daniels | |
| 8,459,472 B2 | 6/2013 | Hofman | |
| 8,474,632 B2 | 7/2013 | Yang et al. | |
| 8,596,473 B2 | 12/2013 | Newbould et al. | |
| 8,646,625 B2 | 2/2014 | Wang | |
| D702,887 S | 4/2014 | Petruccelli | |
| D703,381 S | 4/2014 | Petruccelli | |
| D781,071 S * | 3/2017 | Callif | D6/566 |
| 9,681,781 B2 * | 6/2017 | Hurley | A47F 5/0876 |
| 2004/0099624 A1 | 5/2004 | Hein | |
| 2006/0049124 A1 * | 3/2006 | Wang | A47B 43/003 211/113 |
| 2011/0094985 A1 | 4/2011 | Austin | |
| 2012/0097692 A1 | 4/2012 | Wang | |
| 2012/0145847 A1 | 6/2012 | Wang | |
| 2013/0221172 A1 | 8/2013 | Owen et al. | |
| 2014/0001325 A1 | 1/2014 | Friesch | |
| 2014/0084118 A1 * | 3/2014 | Tooley | A47K 10/10 248/205.3 |
| 2015/0096117 A1 | 4/2015 | Forrest et al. | |

\* cited by examiner

PERSONAL CARE ACCESSORY SUPPORT SYSTEM

CROSS-REFERENCE TO RELATED APPLICATIONS

This application is a continuation of U.S. application Ser. No. 14/918,076 filed Oct. 20, 2015, now U.S. Pat. No. 9,681,781 B2, the disclosure of which is hereby incorporated in its entirety by reference herein.

TECHNICAL FIELD

Various embodiments relate to personal care accessory support systems.

BACKGROUND

The prior art has provided racks, rails and baskets for storing and supporting personal accessories.

SUMMARY

According to at least one embodiment, a personal care accessory support system is provided with a rail with at least one fastener configuration to fasten the rail to an upright support surface. A plurality of receptacles is formed in the rail. At least two accessory holders are provided. Each of the at least two accessory holders is provided with a base to receive and support an accessory. A retainer is sized to extend over the rail in a horizontal orientation of the rail to mount and support the accessory holder on the rail. The retainer is also sized to extend into one of the plurality of receptacles in a vertical orientation of the rail to mount and support the accessory holder on the rail.

According to at least another embodiment, a personal care accessory support system is provided with a rail with at least one fastener configuration to fasten the rail to an upright support surface. The rail is provided with a pair of spaced apart elongate beams. A plurality of cross members connects the pair of beams. A plurality of receptacles is defined within the pair of beams and at least one of the plurality of cross members. A plurality of alignment projections extend from the rail cross members away from the support surface, each adjacent one of the receptacles. At least two accessory holders are provided with a base to receive and support an accessory, with a slot sized to receive one of the plurality of alignment projections in both a horizontal orientation and a vertical orientation of the rail. A retainer is sized to extend over the rail in the horizontal orientation of the rail to mount and support the accessory holder on the rail. The retainer is also sized to extend into one of the plurality of receptacles in the vertical orientation of the rail to mount and support the accessory holder on the rail.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In some households and dwellings, space is at a premium. Washroom spaces, such as countertops may become overly burdened and/or cluttered with personal care products. Getting these products neat and organized while keeping them within easy access at an affordable price can be challenging to the consumer.

Typical devices that help organize personal care products are countertop toothbrush holders, drink cups, soap dispensers, and the like. These products add to the already overburdened countertop space. Hair dryers, flat irons and other hair care accessories reduce the amount of counter space since these items are typically placed onto the countertop for ready use. The disclosed embodiments provide a new organization product which is relatively easy to install and allows the consumer to free up bathroom counter space. The embodiments hold common items off the surface of the counter, making it easy to clean, while allowing for easy access to these items.

Figure 1:
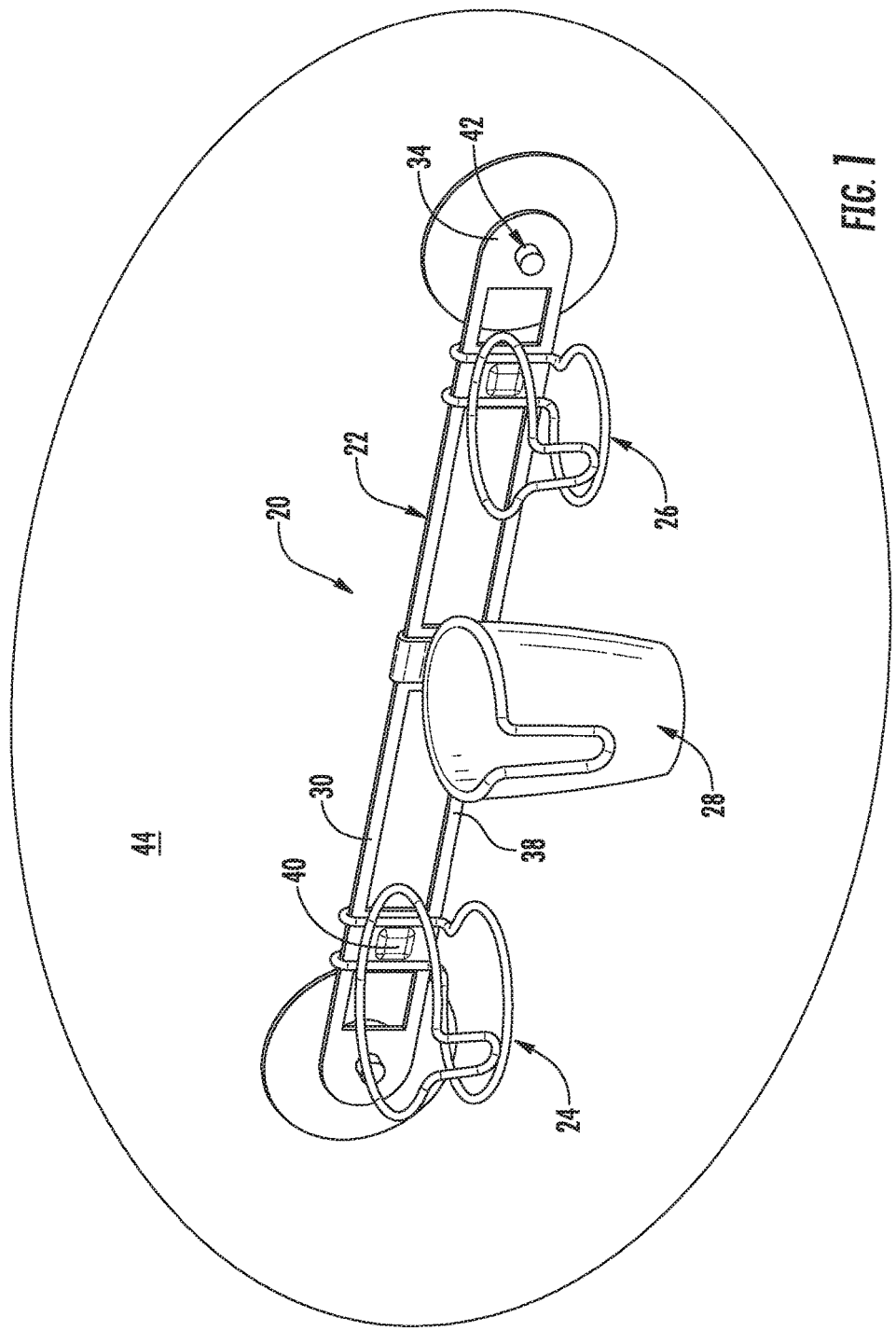
FIG. 1 is a perspective view of a personal care accessory system, illustrated in a horizontal orientation.

FIG. 1 illustrates a personal care accessory support system 20 according to an embodiment. The personal care support system is illustrated as a hair care holster, for example, which can hold a hair dryer, flat iron, hair brushes and elastic bands. This system 20 can be installed onto glass mirrors using one mounting method or could be mounted onto drywall using yet another mounting method. In order to take full advantage of available spaces, the system 20 can be installed in either a horizontal orientation as depicted, or a vertical orientation.

This personal care accessory support system utilizes a common rail 22 for supporting individual accessory holders 24, 26, 28. In the depicted embodiment, the accessory holders 24, 26, 28 are embodied as a hair dryer holder 24, a flat iron holder 26, and a holder 28 for a hair brush, elastics, pins, and the like. Although the depicted embodiment is illustrated for supporting hair care products, the system 20 is modular and is adaptable for other common personal care products, such as a tumbler, toothbrush holder, soap dish and the like.

Figure 2:
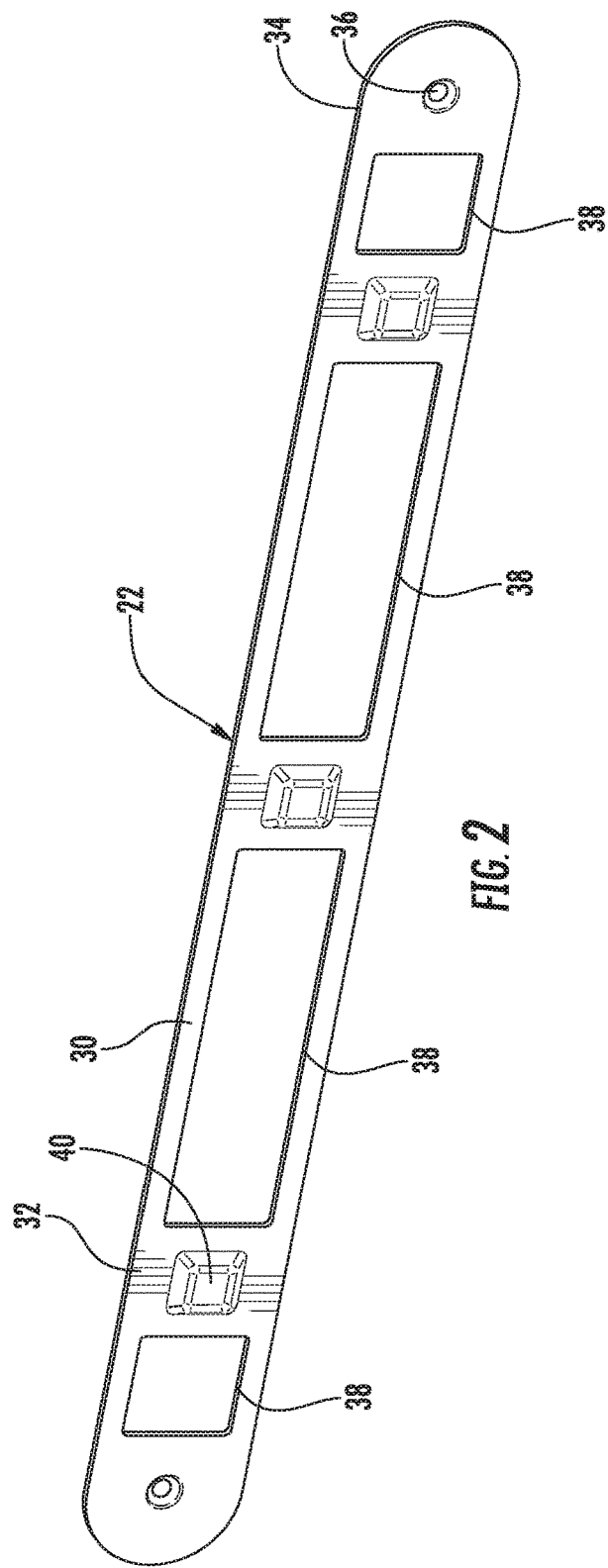
FIG. 2 is a perspective view of a rail of the personal care accessory system of FIG. 1.

FIG. 2 illustrates the rail 22 in greater detail. The rail 22 may be formed from stamped metal, injection molded, or formed from any suitable material and process. The rail 22 includes a pair of spaced apart elongate beams 30. A plurality of cross members 32 interconnects the beams 30. A bracket 34 is provided at each terminal end of the beams 30. An aperture 36 is provided in each bracket 34 for fastening the rail 22. A plurality of receptacles 38 are formed in the rail 22. Each receptacle 38 is bounded by the pair of beams 30. Each receptacle 38 is also bounded by a pair of the cross members 32, or one cross member 32 and one bracket 34.

A plurality of alignment projections 40 are each formed on the cross members 32. The projections 40 extend forward from the rail 22. The projections 40 are each shaped as a projected parallelogram with a similar height and width and with generally flat perimeter surfaces. The projections 40 are also centered on the cross members 32 for a similar spacing relative to the beams 30 and the receptacles 38.

Referring again to FIG. 1, the personal care accessory support system 20 includes a pair of fastener assemblies 42 to mount the system 20 to an upright support surface 44. In the depicted embodiment, the fastener assembly 42 is employed for attachment to glass mirrors or other smooth surfaces typical to bathrooms.

Figure 3:
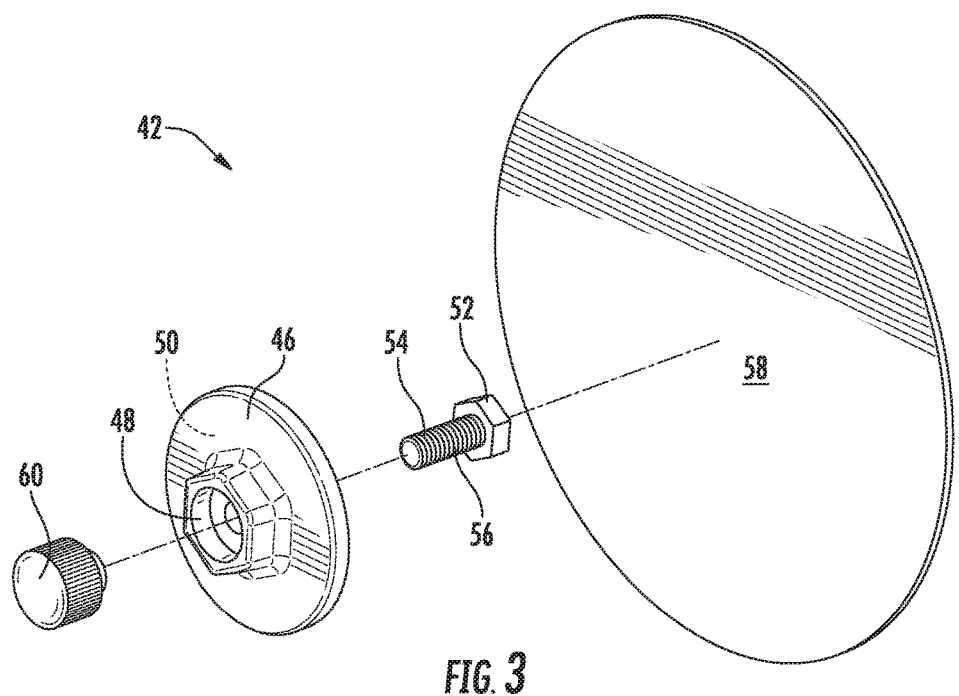
FIG. 3 is an exploded perspective view of a fastener assembly of the personal care accessory system of FIG. 1.

The fastener assembly 42 is illustrated in greater detail in FIG. 3. A clear polymeric spacer 46 is provided behind the rail 22. The spacer 46 spaces the rail 22 away from the upright support surface 44. A through aperture 48 is formed through the spacer 46. A recess 50 is formed in the spacer 46 for receipt of a hex head 52 of a bolt 54. A shank 56 of the bolt 54 extends through the spacer aperture 48 and the rail aperture 36. The recess 50 includes at least one flat for limiting rotation of the bolt 54 in the spacer 46. A pad 58 is provided with adhesive on both surfaces for adhering to the spacer 46 and the support surface 44. The adhesive for bonding with the support surface 44 may be a reversible adhesive, as is known in the art, for long term performance and reusability. The pad 58, spacer 46 and constrained bolt 54 may be installed to the upright support surface 44 before installing the rail 22. After the rail 22 is installed on the bolts 54, a pair of externally knurled nuts 60 engages the bolts 54 and retains the rail 22 upon the bolts 54.

Figure 4:
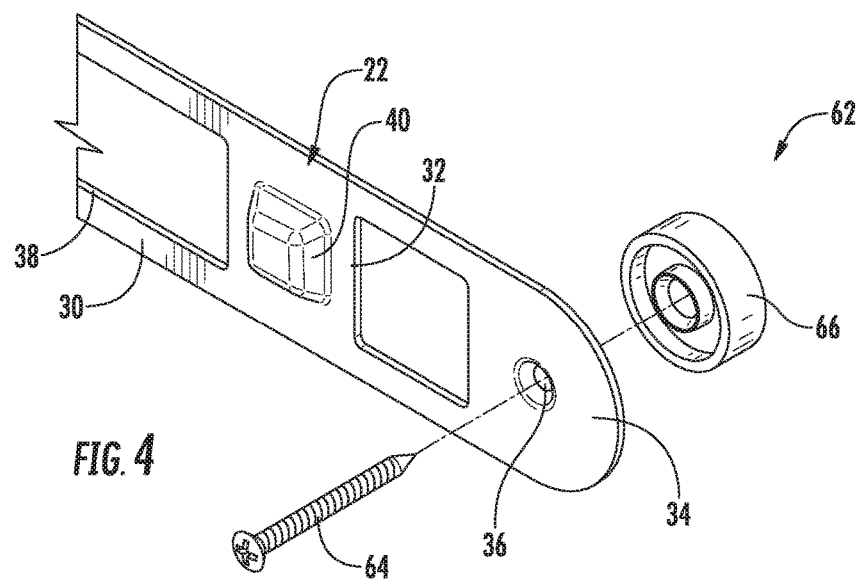
FIG. 4 is an exploded perspective view of a fastener assembly of a personal care accessory system according to another embodiment.

FIG. 4 illustrates an alternative fastener assembly 62 with a screw 64 and a spacer 66. This fastener assembly 62 is useful for installation onto common construction surfaces used in the home such as drywall, paneling, masonry, or the like.

Figure 5:
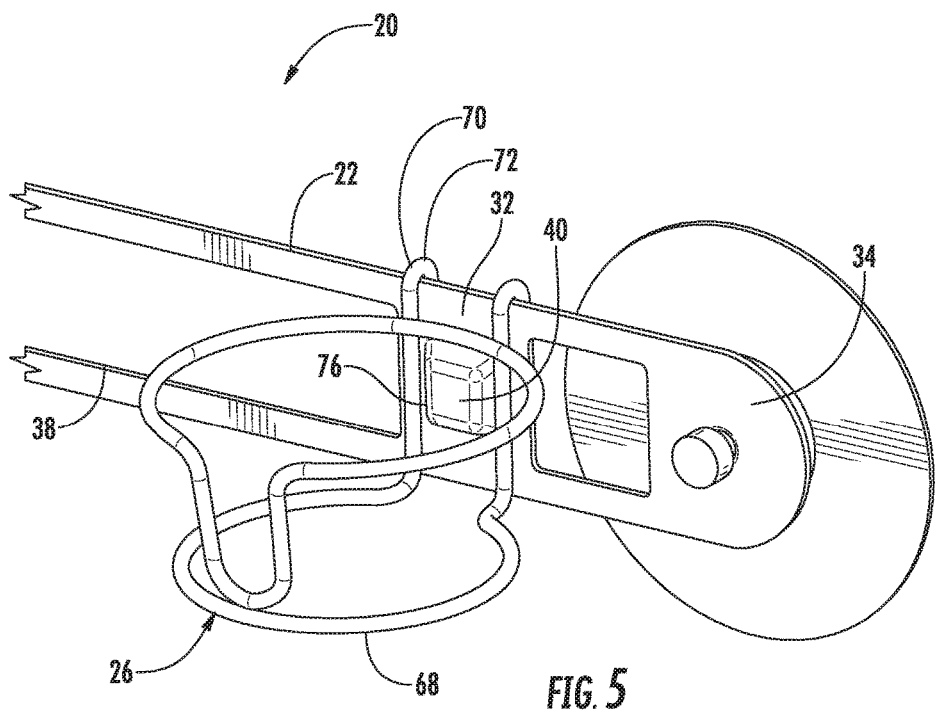
FIG. 5 is an enlarged perspective view of a portion of the personal care accessory system of FIG. 1.
Figure 6:
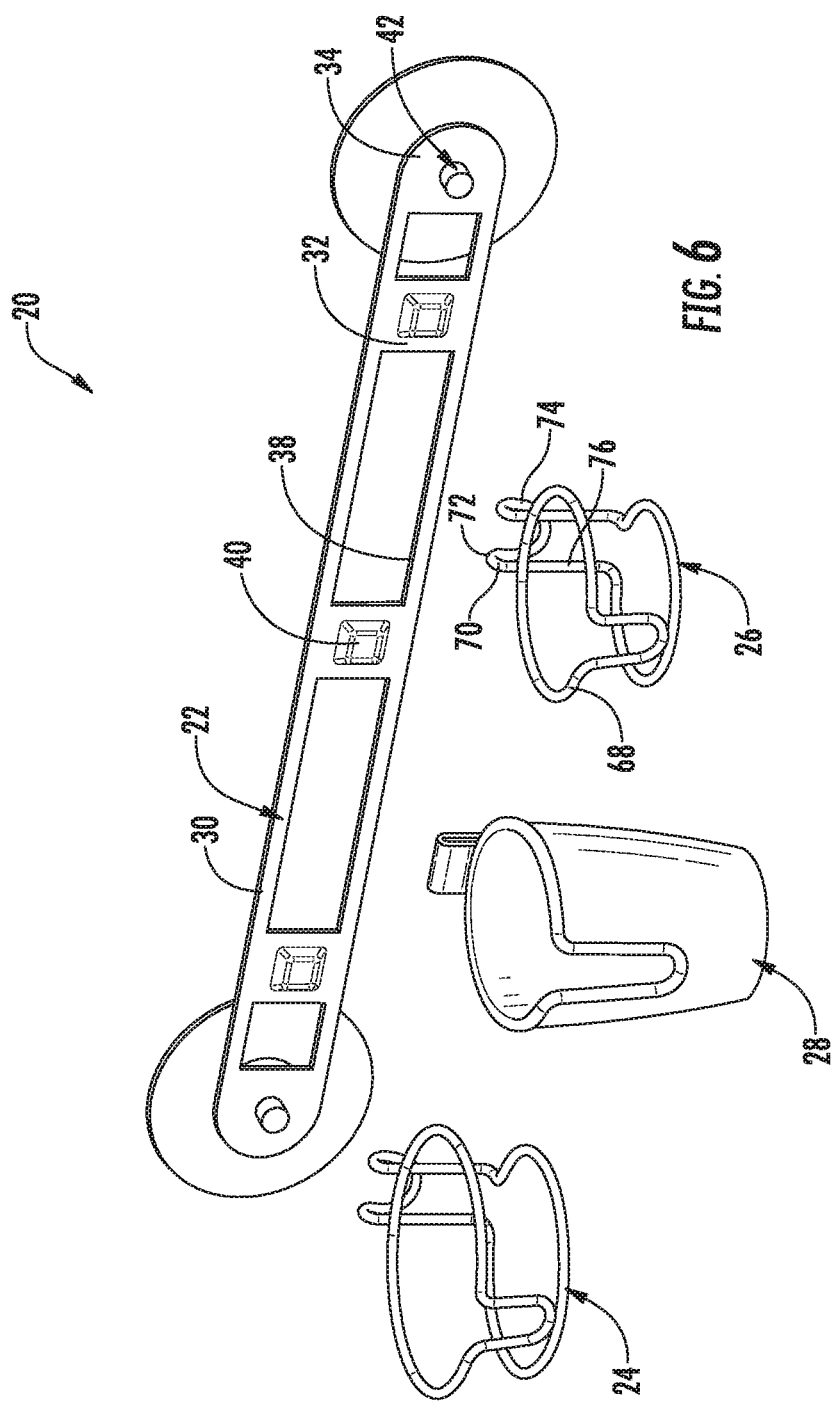
FIG. 6 is a partially exploded perspective view of the personal care accessory system of FIG. 1.

FIG. 5 illustrates one of the accessory holders 26 in greater detail. Each accessory holder 24, 26, 28 includes a base 68 for receipt and support of the accessory. The base 68 of the flat-iron accessory holder 26 is formed from metal wire, for example. With reference to FIGS. 5 and 6, the base 68 of the hair dryer holder 24 is also metal wire, for example. The base 68 of the hair brush basket 28 may be polymeric, by way of another example. Each accessory holder 24, 26, 28, also includes a retainer 70 with a shoulder 72 to extend over the rail 22 and an arm 74 to extend behind the rail 22 in a clearance space provided by the spacer 46.

A slot 76 is provided in each accessory holder base 68 for receipt of the alignment projection 40. The engagement of the projections 40 in the slots 76 limits rotation of the accessory holders 24, 26, 28 when devices such as hair dryers are loading the product to the left of right of the centerline of the product.

Figure 7:
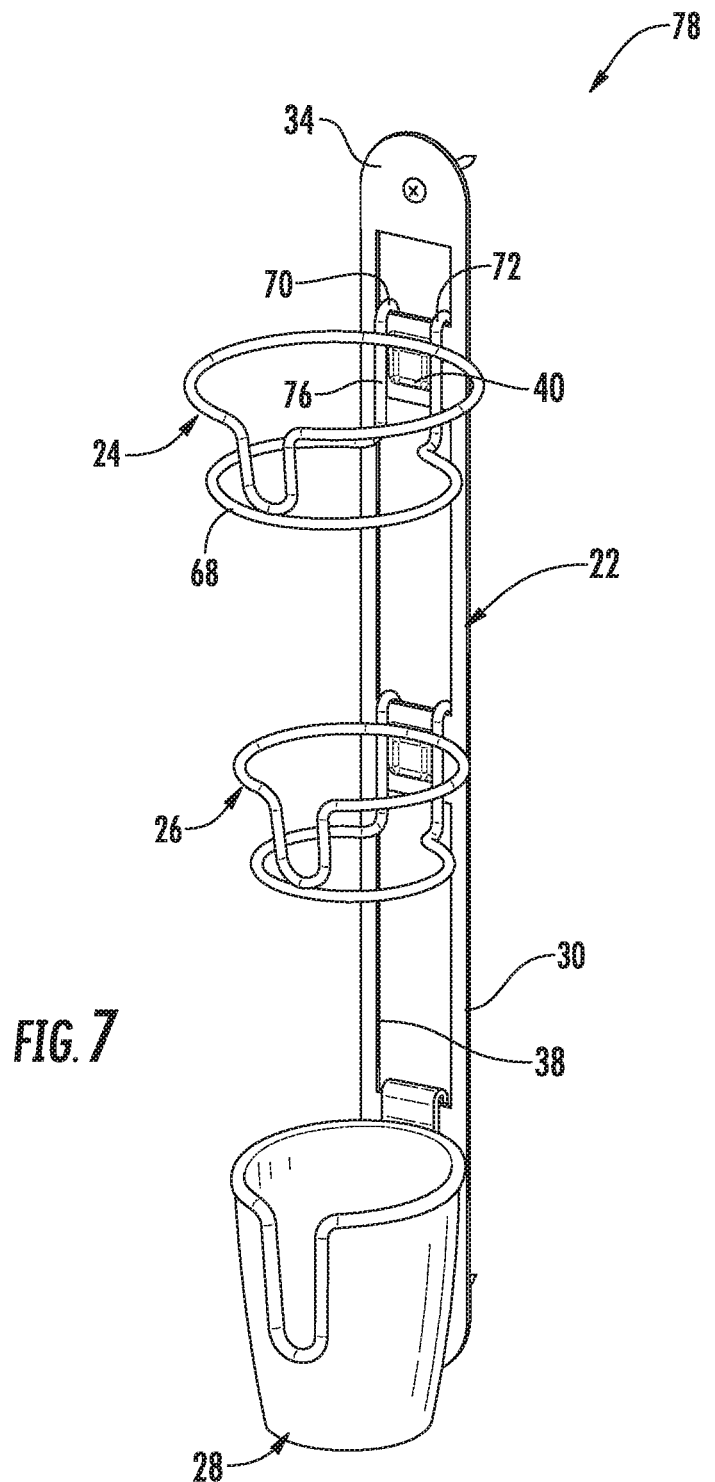
FIG. 7 is a perspective view of a personal care accessory system according to another embodiment, illustrated in a vertical orientation.
Figure 8:
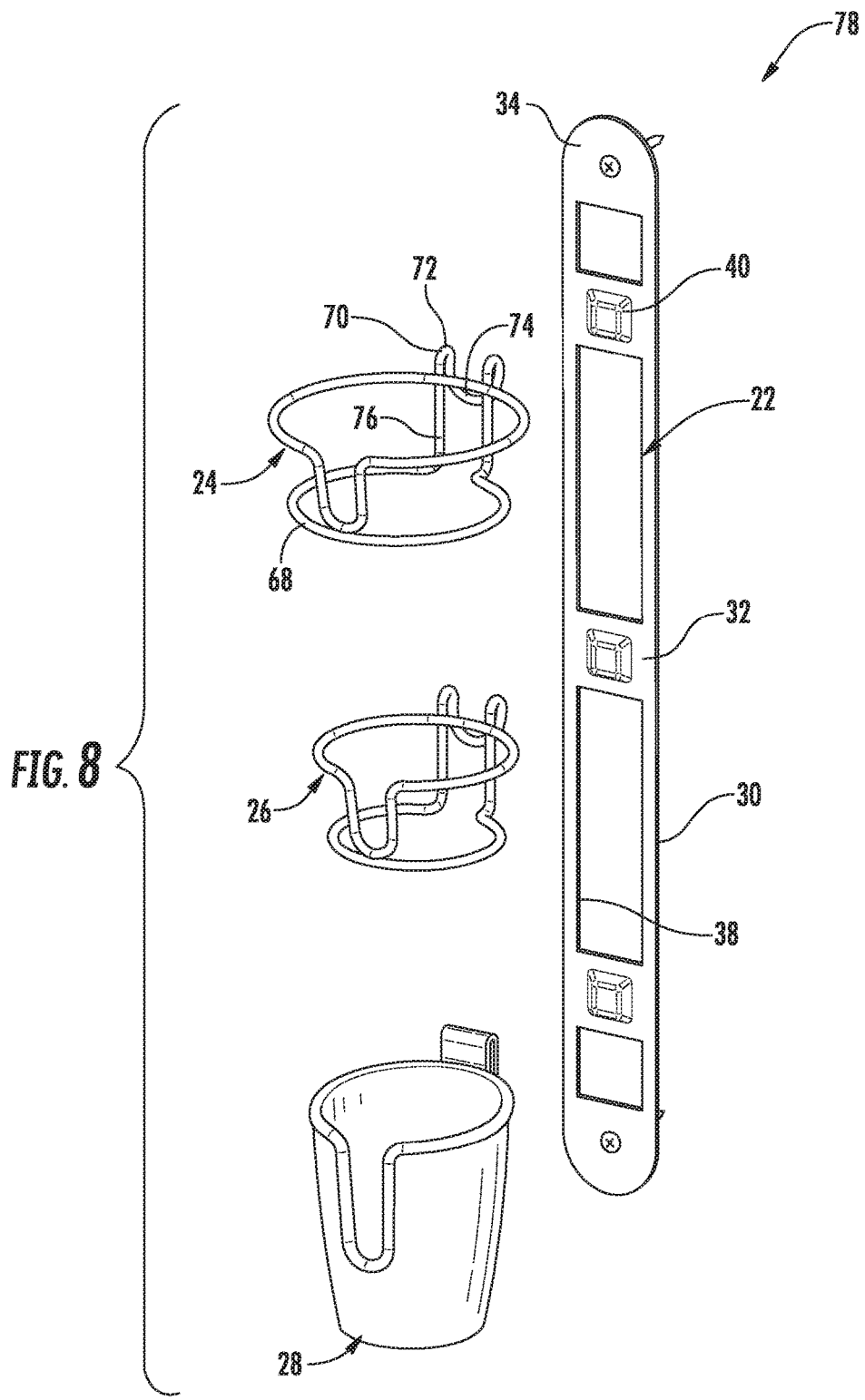
FIG. 8 is an exploded perspective view of the personal care accessory system of FIG. 7.
Figure 9:
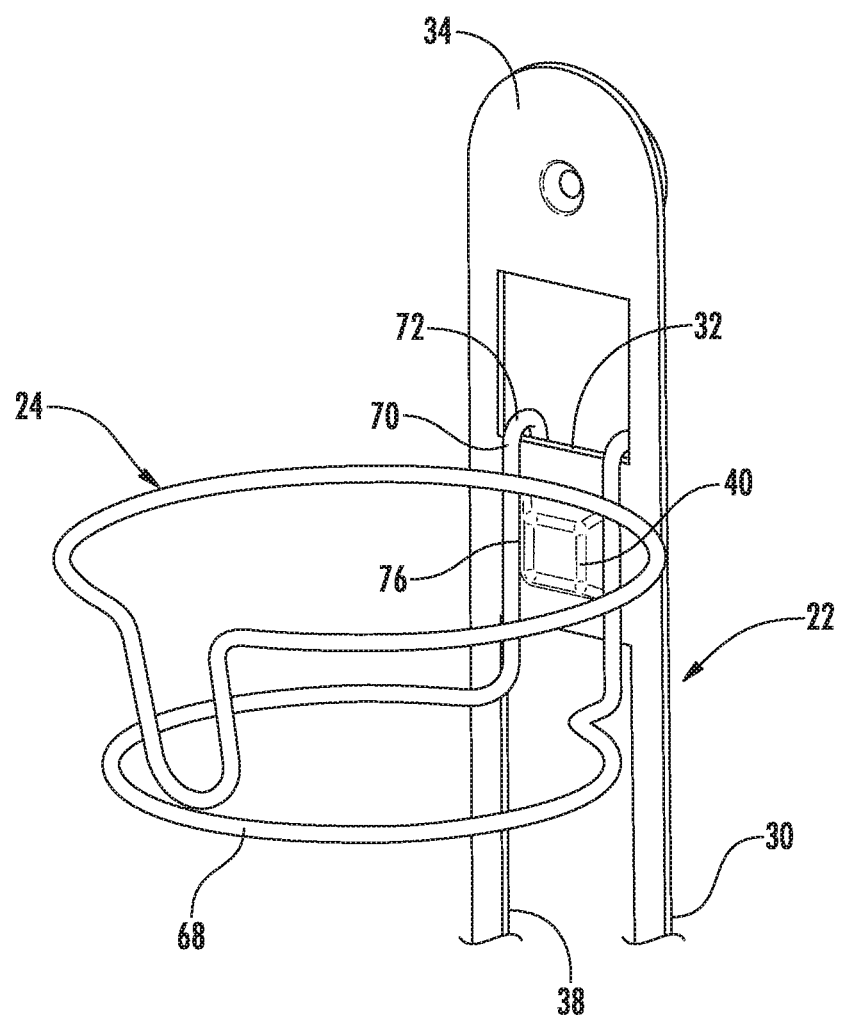
FIG. 9 is an enlarged perspective view of a portion of the personal care accessory system of FIG. 7.

FIGS. 7-9 illustrate a personal care accessory system 78 installed in a vertical orientation, according to another embodiment. The rail 22 is installed as described above, however in a vertical orientation. The accessory holders 24, 26, 28 are installed upon the rail 22 by inserting the arm 74 of each retainer 70 into one of the receptacles 38 of the rail 22. The shoulder 72 of each retainer 70 is supported on one of the cross members 32. Due to the symmetry of the projections 40, the projections 40 are received in the slots 76 of the accessory holders for alignment and limiting rotation.

The modularity of the personal care support system 20, 78 permits the user to install the rail 22 in horizontal or vertical orientations, and permits user customization of the arrangement of the accessory holders 24, 26, 28.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A personal care accessory support system comprising:
   a rail with an aperture to fasten the rail to an upright support surface, and a plurality of receptacles formed in the rail;
   at least two accessory holders, each of the at least two accessory holders comprising a base to receive and support an accessory, and a retainer sized to mount and support the accessory holder on the rail;
   a spacer with a recess with at least one flat and an aperture aligned with the rail aperture;
   a bolt with a head received in the spacer recess in engagement with the at least one flat to limit rotation of the bolt in the spacer, and a shank extending through the spacer aperture and the rail aperture;
   a nut engaged with the bolt shank; and
   an adhesive to adhere the spacer to the upright support surface;
   wherein the at least two accessory holders comprise at least one of a hair dryer holder, a flat iron holder, a hair brush holder, a tumbler, and a toothbrush holder; and
   wherein the rail is formed from stamped sheet metal.

2. The personal care accessory support system of claim 1 wherein the retainer is sized to extend over the rail when the rail is oriented in a horizontal orientation to mount and support the accessory holder on the rail; and
   wherein the retainer is sized to extend into one of the plurality of receptacles when the rail is oriented in a vertical orientation to mount and support the accessory holder on the rail, so that the rail and at least two accessory holders can be utilized in either of the horizontal and vertical orientations of the rail.

3. The personal care accessory support system of claim 2 wherein the spacer is provided on the rail between the rail and the upright support surface to provide clearance between the rail and the support surface for receipt of the retainer.

4. The personal care accessory support system of claim 2 further comprising a plurality of alignment projections extending from the rail away from the support surface.

5. The personal care accessory support system of claim 4 wherein the base of each accessory holder is provided with a slot to receive one of the plurality of alignment projections.

6. The personal care accessory support system of claim 5 wherein each of the plurality of alignment projections is oriented to engage one of the slots in the at least two accessory holders in either of the horizontal orientation and the vertical orientation of the rail.

7. The personal care accessory support system of claim 6 wherein each of the plurality of alignment projections has a width that is generally equivalent to a height of each projection for engagement with one of the slots in either of the horizontal orientation and the vertical orientation of the rail.

8. The personal care accessory support system of claim 7 wherein each of the plurality of alignment projections is formed as a parallelogram projected from the rail with generally flat perimeter surfaces oriented about the parallelogram and connecting the parallelogram to the rail, to be received within the slot of the corresponding accessory holder to minimize rotation of the accessory holder upon the rail.

9. The personal care accessory support system of claim 2 wherein the rail comprises:
 a pair of spaced apart elongate beams; and
 a plurality of cross members connecting the pair of beams, wherein each of the plurality of receptacles is defined within the pair of beams and a pair of the plurality of cross members.

10. The personal care accessory support system of claim 9 further comprising a plurality of alignment projections each extending from one of the plurality of cross members away from the support surface.

11. The personal care accessory support system of claim 1 wherein at least one of the at least two accessory holders, is formed from metal wire.

12. The personal care accessory support system of claim 1 wherein the adhesive is reversible.

13. A personal care accessory support system comprising:
 a rail with an aperture to fasten the rail to an upright support surface, and a plurality of receptacles formed in the rail;
 at least two accessory holders, each of the at least two accessory holders comprising a base to receive and support an accessory, and a retainer sized to mount and support the accessory holder on the rail;
 a spacer with a recess with at least one flat and an aperture aligned with the rail aperture;
 a bolt with a head received in the spacer recess in engagement with the at least one flat to limit rotation of the bolt in the spacer, and a shank extending through the spacer aperture and the rail aperture;
 a nut engaged with the bolt shank; and
 an adhesive to adhere the spacer to the upright support surface;
 wherein the adhesive is reversible;
 wherein the retainer is sized to extend over the rail when the rail is oriented in a horizontal orientation to mount and support the accessory holder on the rail; and
 wherein the retainer is sized to extend into one of the plurality of receptacles when the rail is oriented in a vertical orientation to mount and support the accessory holder on the rail, so that the rail and at least two accessory holders can be utilized in either of the horizontal and vertical orientations of the rail.

14. The personal care accessory support system of claim 13 wherein the spacer is provided on the rail between the rail and the upright support surface to provide clearance between the rail and the support surface for receipt of the retainer.

15. A personal care accessory support system comprising:
 a rail with an aperture to fasten the rail to an upright support surface, and a plurality of receptacles formed in the rail;
 at least two accessory holders, each of the at least two accessory holders comprising a base to receive and support an accessory, and a retainer sized to mount and support the accessory holder on the rail;
 a clear polymeric spacer with a recess with at least one flat and an aperture aligned with the rail aperture;
 a bolt with a head received in the spacer recess in engagement with the at least one flat to limit rotation of the bolt in the spacer, and a shank extending through the spacer aperture and the rail aperture;
 a nut engaged with the bolt shank; and
 an adhesive to adhere the spacer to the upright support surface;
 wherein the retainer is sized to extend over the rail when the rail is oriented in a horizontal orientation to mount and support the accessory holder on the rail; and
 wherein the retainer is sized to extend into one of the plurality of receptacles when the rail is oriented in a vertical orientation to mount and support the accessory holder on the rail, so that the rail and at least two accessory holders can be utilized in either of the horizontal and vertical orientations of the rail.

16. The personal care accessory support system of claim 15 wherein the spacer is provided on the rail between the rail and the upright support surface to provide clearance between the rail and the support surface for receipt of the retainer.

17. The personal care accessory support system of claim 15 wherein the adhesive is reversible.

18. A personal care accessory support system comprising:
 a rail with an aperture to fasten the rail to an upright support surface, and a plurality of receptacles formed in the rail;
 at least two accessory holders, each of the at least two accessory holders comprising a base to receive and support an accessory, and a retainer sized to mount and support the accessory holder on the rail;
 a spacer with a recess with at least one flat and an aperture aligned with the rail aperture;
 a bolt with a head received in the spacer recess in engagement with the at least one flat to limit rotation of the bolt in the spacer, and a shank extending through the spacer aperture and the rail aperture;
 a nut engaged with the bolt shank; and
 an adhesive to adhere the spacer to the upright support surface;
 wherein the at least two accessory holders comprise at least one of a hair dryer holder, a flat iron holder, a hair brush holder, a tumbler, and a toothbrush holder; and
 wherein at least one of the at least two accessory holders, is formed from metal wire.

* * * * *